(12) United States Patent
Badaoui-Najjar et al.

(10) Patent No.: US 9,015,454 B2
(45) Date of Patent: Apr. 21, 2015

(54) BINDING DATA TO COMPUTERS USING CRYPTOGRAPHIC CO-PROCESSOR AND MACHINE-SPECIFIC AND PLATFORM-SPECIFIC KEYS

(75) Inventors: Ramez N. Badaoui-Najjar, Tomball, TX (US); Kevin G. Depew, Spring, TX (US); Jason Spottswood, Houston, TX (US); E. David Neufeld, Magnolia, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 583 days.

(21) Appl. No.: 12/988,954

(22) PCT Filed: May 2, 2008

(86) PCT No.: PCT/US2008/062350
§ 371 (c)(1),
(2), (4) Date: Oct. 21, 2010

(87) PCT Pub. No.: WO2009/134270
PCT Pub. Date: Nov. 5, 2009

(65) Prior Publication Data
US 2011/0040961 A1    Feb. 17, 2011

(51) Int. Cl.
*G06F 1/24* (2006.01)
*G06F 21/57* (2013.01)
(52) U.S. Cl.
CPC ................ *G06F 21/57* (2013.01)

(58) Field of Classification Search
CPC ................................... G06F 9/4401
USPC ............ 713/164, 2, 200, 189, 193, 176, 156; 726/22, 5
See application file for complete search history.

(56) References Cited

U.S. PATENT DOCUMENTS

| | | | |
|---|---|---|---|
| 6,988,250 B1 | 1/2006 | Proudler et al. | |
| 8,190,916 B1* | 5/2012 | Wang et al. | 713/193 |
| 2003/0056109 A1 | 3/2003 | Elliott et al. | |
| 2003/0084285 A1* | 5/2003 | Cromer et al. | 713/164 |
| 2005/0108564 A1* | 5/2005 | Freeman et al. | 713/200 |
| 2005/0120219 A1* | 6/2005 | Munetoh et al. | 713/176 |
| 2005/0138345 A1 | 6/2005 | Cromer et al. | |
| 2005/0141717 A1 | 6/2005 | Cromer et al. | |
| 2006/0085630 A1* | 4/2006 | Challener et al. | 713/2 |

(Continued)

FOREIGN PATENT DOCUMENTS

| | | |
|---|---|---|
| CN | 1713101 A | 12/2005 |
| CN | 1752887 A | 3/2006 |

(Continued)

OTHER PUBLICATIONS

International Search Report and Written Opinion, dated Jun. 29, 2009, 11 pages.

(Continued)

*Primary Examiner* — Thomas Lee
*Assistant Examiner* — Aurel Prifti
(74) *Attorney, Agent, or Firm* — Hewlett-Packard Patent Department

(57) ABSTRACT

Using a cryptographic co-processor in a computing system to encode data parameters determined during initialization, or during operation, or determined from machine specific values or states to bind data optionally to a specific machine, a specific cryptographic co-processor, or a specific operating environment machine state.

11 Claims, 3 Drawing Sheets

(56) References Cited

U.S. PATENT DOCUMENTS

| | | | |
|---|---|---|---|
| 2006/0112420 A1* | 5/2006 | Challener et al. ............... 726/5 |
| 2006/0161790 A1* | 7/2006 | Hunter et al. ............... 713/189 |
| 2006/0212939 A1* | 9/2006 | England et al. ............... 726/22 |
| 2007/0101156 A1* | 5/2007 | Novoa et al. ............... 713/190 |
| 2007/0136577 A1* | 6/2007 | Bade et al. ............... 713/164 |
| 2007/0192630 A1 | 8/2007 | Crane et al. |
| 2008/0059799 A1 | 3/2008 | Scarlata |
| 2008/0130893 A1* | 6/2008 | Ibrahim et al. ............... 380/277 |
| 2008/0270781 A1* | 10/2008 | Ibrahim et al. ............... 713/2 |
| 2009/0204806 A1* | 8/2009 | Kanemura et al. ............ 713/155 |
| 2009/0307487 A1* | 12/2009 | Movva et al. ............... 713/156 |

FOREIGN PATENT DOCUMENTS

| | | |
|---|---|---|
| WO | WO-9721290 | 6/1997 |
| WO | WO-2005026951 | 3/2005 |

OTHER PUBLICATIONS

Bryan.Parno, "The Trusted Platform Module (TPM) and Sealed Storage", RSA technical note by EMC, www.rsa.com/rsalabs/technotes/tpm/sealedstorage.pdf, Jun. 21, 2007, 3 pages.

Sailer, et .al, "The Role of TPM in Enterprise Security", IBM Research Report, RC23363 (W0410-029) Oct. 6, 2004, 7 pages.

Hans Brandl, et al, Trusted Computing: The TCG Trusted Platform Module Specification Embedded Systems, 2004, see chapter 4, 16 pages.

International Searching Authority, The International Search Report and the written Opinion, Dec. 17, 2008, 9 Pages.

S. Bajikar, "Trusted Platform Module (TPM) based Security on Notebook PCs", White Paper, 1-20 Mobile Platforms Group Intel Corp., Jun. 20, 2002, 20 Pages.

* cited by examiner

BINDING DATA TO COMPUTERS USING CRYPTOGRAPHIC CO-PROCESSOR AND MACHINE-SPECIFIC AND PLATFORM-SPECIFIC KEYS

CROSS REFERENCE TO RELATED APPLICATIONS

This application relates to a previously filed U.S. utility application entitled "BINDING A CRYPTOGRAPHIC MODULE TO A PLATFORM", filed on 2 Apr. 2008, SN PCT/2008/059093, which utility application is hereby incorporated by reference into the present application.

BACKGROUND OF THE INVENTION

Cryptographic co-processors perform several functions, such as generating encryption keys, storing secrets, encrypting data, decrypting data, signing data, and verifying signatures and providing 'accumulators' to store and extend measurements. Such processors are becoming increasingly important for computer security.

In order to provide trust in computing, the Trusted Computing Group (TCG) developed a Trusted Platform Module (TPM) providing specifications for a secure cryptographic processor that can perform the previously mentioned operations in a cost effective and industry standard manner. TPM provides various functions, such as secure generation of cryptographic keys, remote attestation, secure storage of keys, binding, and a hardware random number generator. In general it is used to form an inexpensive basis to root the trust and security of the software environment on the platform.

In a previous application, applicants described a method of binding a removable TPM to a specific platform where the TPM would, among other functions, enter an "Attack Mode" if it was determined that the TPM had been moved from the platform to which it was bound. In the current application, the applicants describe an alternate functionality of a TPM, In this embodiment the TPM does not distinguish when the TPM has been tampered with, which would place it in Attack Mode as under previous embodiments, but it is still able to protect encrypted data stored on the platform.

DETAILED DESCRIPTION OF THE PREFERRED EMBODIMENTS

Figure 1:
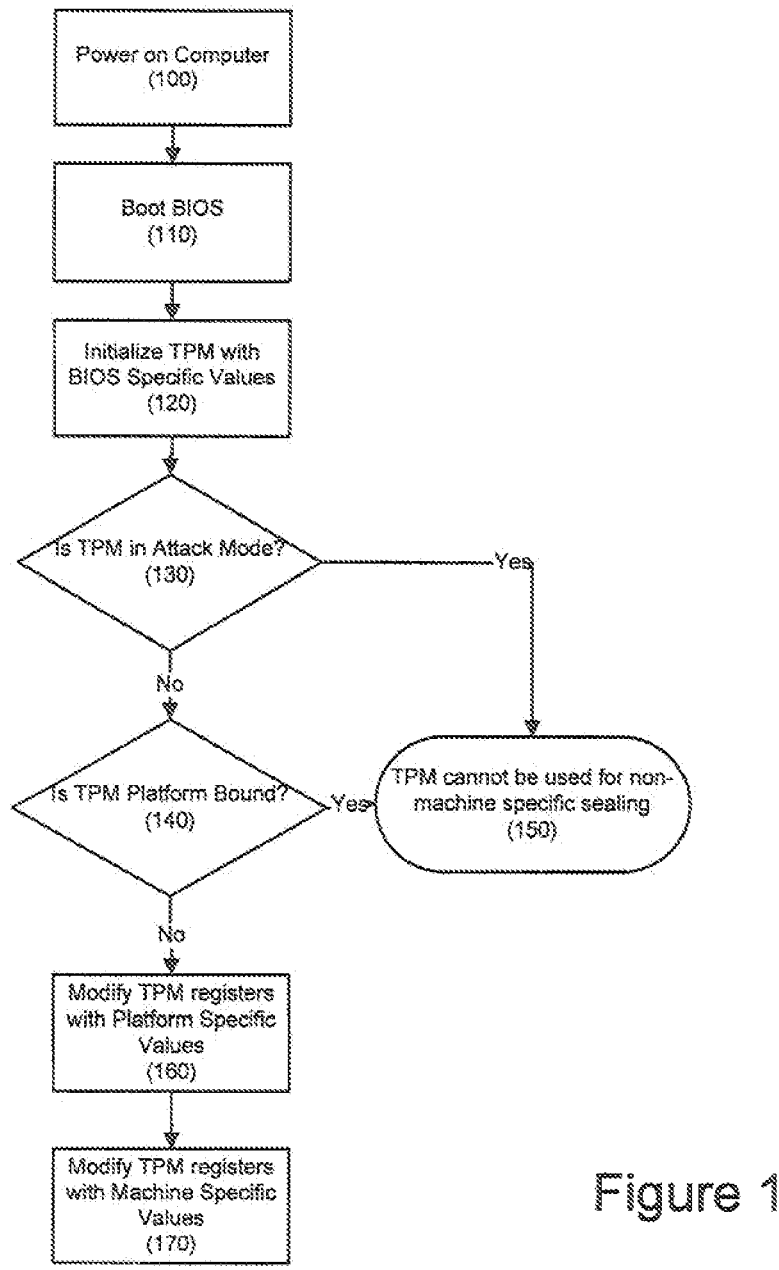
FIG. 1 illustrates a flow diagram for initializing a TPM in accordance with an exemplary embodiment of the present invention.

A TPM is a cryptographic co-processor, which is installed in a computing platform (a host) to add functionality for securing or validating data in a specific environment. It accomplishes this through a procedure called sealing the data, which includes some techniques which are beyond the scope of this application. The data may, in certain situations, be unsealed; that is, returned to a non-secured state allowing the data to be processed in a manner common to data in the computing environment.

In typical computing environments including a TPM, the TPM is bound to the host. This binding can be through physical means such as soldering to the motherboard, and/or can include a removable TPM that is cryptographically bound to the motherboard as described in a previous application. A TPM that is cryptographically bound to the motherboard has internal procedures for determining if it is removed from the original host. Removal from the original host may signal an attack, an attempt to breach the security provided by the TPM. In this situation, the TPM may take certain steps to protect the data stored inside the TPM. In some situations, the binding of the TPM to a specific platform may not be desired. In other circumstances, it may be desirable for a TPM to continue normal operation, as opposed to entering attack mode, when it is moved to another platform (a second host). In this second host, it may be desirable for the TPM to unseal encrypted data that belongs to the original host, or it may be desirable for the TPM to protect the encrypted storage that belongs to original host by not unsealing it, thereby preventing its use.

A TPM has internal registers or accumulators ("registers") which may be initialized or modified internally by the TPM's operations/data, which may include the TPM's serial number, or endorsement key. The registers may also be initialized or modified by the BIOS of the host machine both during initialization, and during normal system operation. The registers may also be initialized or modified by the OS during both booting and normal system operations. The registers may also be initialized or modified by a system operator/user through a configuration operation, possibly in conjunction with a sealing or unsealing operation. When the values in the registers are determined by the operational state of the system, the initial value is called a measurement as it is a measure or indication of the system state. Modifying the measurement value with new parameters is called extending the measurement. The process for making a measurement or extending a measurement is specified by the Trusted Computing Group (TCG), specifically in TCG's TPM specification version 1.2 Revision 103, incorporated herein by reference.

These values stored in the registers, or measurements, may not be stored internal to the TPM between operational sequences. i.e. the data is not persistent across power cycles. The values used to extend the register values, i.e. extend the measurements, may be stored in locations on the machine or network, such as a smart card, or a password vault. The values also may be supplied by a user as a credentialed log on sequence to authenticate the user.

One skilled in the art would normally refer to these register values as keys. These keys are used in the encryption and decryption process such that using different keys during the decryption process than was used in the encryption process will fail to decrypt the data to a usable state. The exact mechanism for use of the keys for encryption and decryption is beyond the scope of this application.

Some systems, such as Microsoft's Bit-Locker™, provide encrypted storage on hard disk media volumes. In these systems, a key is used for an encryption algorithm. The encryption algorithm is used when data is read from or written to the disk volume. The key to the encryption algorithm is data that may be sealed by a TPM. In this manner, the data on the disk would be inaccessible anywhere other than the original host platform with the original TPM. Further, the TPM may use register values which determine machine state to ensure data is only accessible when the original host machine is in a specifically known state of operation.

One use of a TPM is to bind data to a host. This data may be an application or portion of an application (e.g. a module, subroutine, function). A TPM may selectively use the keys to achieve the desired binding of data to a specific host, a specific platform type, a specific operations, etc. The keys used by the TPM in the encryption process, and the availability of those same keys in different environments determine how the data is to be protected.

The use of specific keys may be determined by user interaction. The use of specific keys may be determined by configuration of security policies in the OS or the BIOS. The uses of specific keys may be determined by the internal configuration of the TPM.

The numeric values may be specific to the TPM, such as a serial number. The numeric values may be specific to the operating environment, such as an Operating System (OS) version number, or a Basic Input/Output System (BIOS) checksum. The numeric values may be accumulations of checksums of programs or routines executed by the system. Such a value would be an accurate measure of the machine's current operational state. The numeric values may be specific to the platform type, such as a model number, or a numeric representation of a specific configuration. The numeric values may be specific to a host, such as a motherboard serial number, or a Media Access Control (MAC) address of a Network Interface Card (NIC) or a Central Processing Unit (CPU) serial number. The numerical values may be specific to a user, such as a passphrase, challenge/response pair, or biometric identifier (fingerprint, iris scan, etc.).

Having different keys available to the TPM for the encryption process allows a variety of methods for securing data to suit the specific needs of the situation. These methods can limit where and how the data can be accessed in the future. Host specific information may be used to extend a particular register. That particular register can be included in the sealing operation to ensure data is only accessible on the specific host. Specifically excluding the particular register from the sealing operation allows the data to be accessible on other host provided the other key's are available. In a system like the Bit-Locker™, described above, by using an encryption key generated by a TPM, the drive may easily be locked to a specific platform, or made platform independent just by which keys the TPM uses for the encryption process.

In one embodiment, data may be bound using only the TPM specific information such as a TPM serial number or endorsement key. In this type of embodiment, the data would be retrievable in different platforms, different types of platforms, under different OSes and different system configurations. The only requirement would be that the same TPM be used to retrieve the data and that the machines software/firmware configuration is similar enough to generate the same measurements in the required registers. In this scenario, data may be migrated to other machines, or other environments, but it would only be accessible in a single machine at a given time because there is only one physical TPM that can properly unseal it. This scenario would be beneficial for licensing enforcement where data is licensed for use on multiple machines, but only one copy may be used at a time.

In another embodiment, data may be bound using only platform type specific information such as a model number, and/or a BIOS, or configuration. In this type of embodiment, the data would be retrievable under several environments but only on a specific platform type. In this scenario, data may be migrated to other machines using other TPM's, but the data would only be accessible for a specific platform type and/or configuration. This scenario would be beneficial for ensuring the platform was properly configured to support the data.

In another embodiment, data may be bound using system specific information. In this type of embodiment, the data would be retrievable only on the specific system under which it was originally bound. This would lock the data to a single machine and ensure it could not be accessed elsewhere even if the TPM is removed and placed in a new system. This scenario is beneficial in situations where security is a concern because data should not be accessed unless it is on a specific machine which may have other physical security preventing its unauthorized use.

FIG. 1 illustrates a flow diagram for initializing a TPM in accordance with an exemplary embodiment of the present invention.

According to block 100, the computer is first powered on. During the power on, the BIOS boots according to block 110. The BIOS identifies hardware in the computer that includes the TPM. The TPM can be physically connected to the computer (for example, to the motherboard or other PCB) with soldering, a socket having a tamper resistant removal, or other form of physical binding.

According to block 120, the BIOS provides the TPM with values or measurements specific to BIOS operation for storage in registers. The values may be shared secrets between the BIOS and the TPM, or they may be measurements of machine state taken by the BIOS during execution. Once the TPM is initialized, the BIOS will determine if the TPM is in 'Attack Mode' 130. If the answer is yes, then the TPM is in a state of protection because it may have detected some form of tampering and the TPM will not be suitable for purposes outlined in this application 150. If the TPM is not in 'Attack Mode,' then the BIOS will determine if the TPM is platform bound 140. If the answer to this question is yes, then the TPM will not be suitable for purposes outlined in this application 150.

If the answer to both queries is no, then the BIOS will supply the TPM with platform specific values 160. These values may include inter alia, the model number, the manufacturer, options installed, etc. This information may have previously been gathered by the BIOS during Boot 110, or may be gathered at this point in the process. The values may be gathered by various mechanisms or techniques. The values supplied to the TPM may be used to initialize new registers, or to extend measurements previously taken.

Next the BIOS will initialize the TPM with machine specific values 170. These values may include, inter alia, the MAC address of the motherboard's primary NIC, the serial number of the primary CPU, etc. This information may have previously been gathered by the BIOS during Boot 110, or may be gathered at this point in the process. The values may be gathered by various mechanisms or techniques. The processes represented in blocks 160 and 170 of the flow chart are independent, and may be performed in any order.

Figure 2:
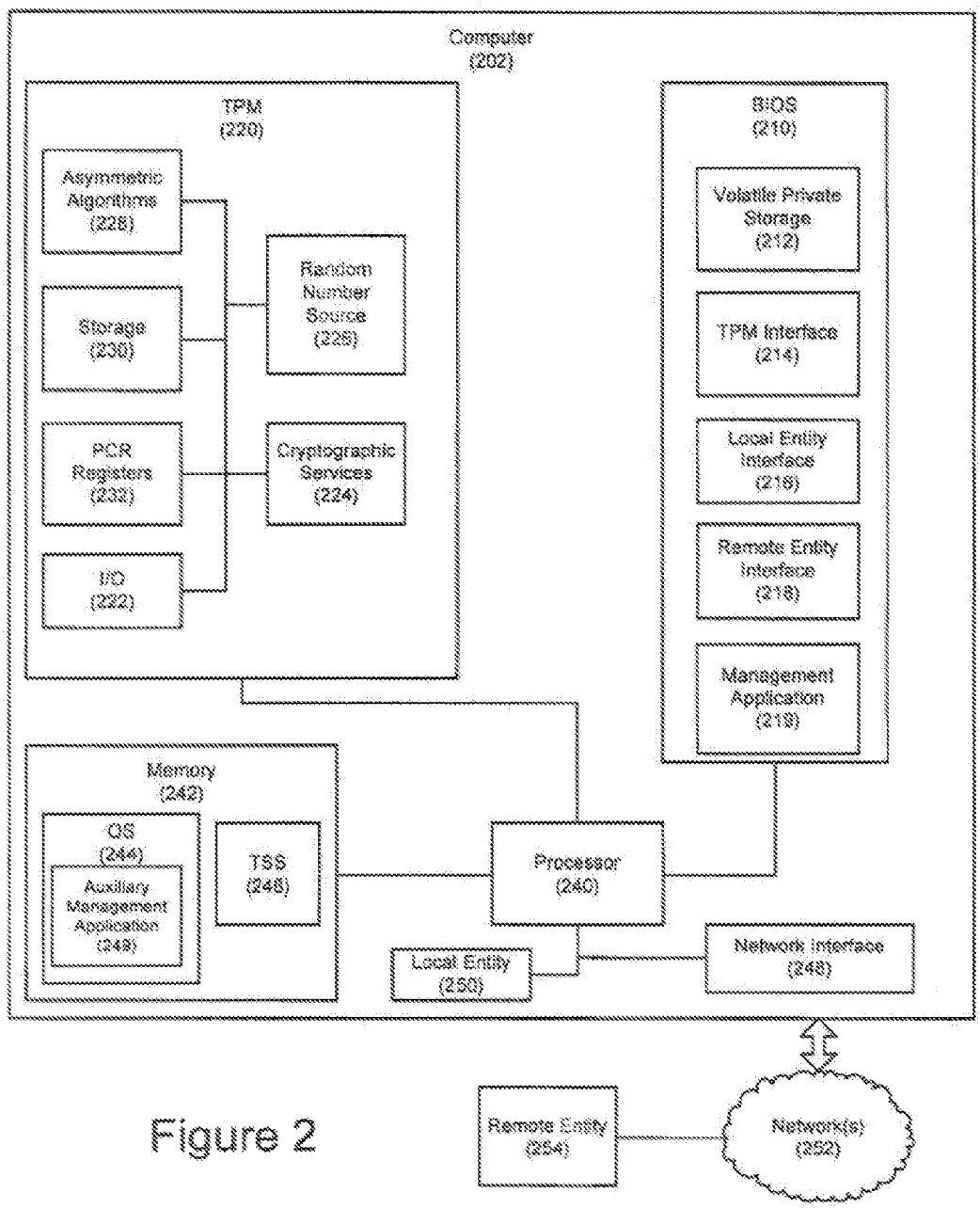
FIG. 2 illustrates a computer system in accordance with an embodiment of the present invention.

As shown in FIG. 2, the system 200 comprises a computer 202 preferably coupled to at least one remote entity 254 via a network 252. The computer 202 may be, for example, a server, a desktop computer, a laptop computer or a mobile device. The computer 202 comprises a processor 240 coupled to at least one local entity 250. As used herein "local entities" refer to hardware/firmware/software entities that are internal to the computer 202 and "remote entities" refer to hardware/firmware/software entities that are external to the computer 202. Examples of local entities include but are not limited to an Operating System and peripherals such as a smartcard reader, a hard disk drive, network controller, and a graphics controller. Examples of remote entities include but are not limited to a server that provides BIOS upgrades or a peer computer that requests information regarding the BIOS's version.

As shown, the processor 240 couples to a network interface 248. The network interface 248 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. Via the network interface 248, the processor 240 is able to connect to and communicate with the network 252 which may represent the Internet, Local Area Network (LANs) or Wide Area Network (WANs). With such a network connection, it is contemplated that the BIOS 210 (via the processor 240) might receive information from the network, or might output information to the network in the course of communicating with the remote entity 254.

As shown in FIG. 2, the processor 240 also has access to a Basic Input/Output System (BIOS) 210 which may be implemented, for example, as part of a chipset (eg., a "Southbridge") or other module. Exemplary embodiments enable the BIOS 210 (or another platform entity) to securely communicate with the local entity 250 and/or the remote entity 254.

The processor 240 also couples to a memory 242 which stores an operating system (OS) 244 for the computer 202. As shown, the memory 242 may also store a Trusted Platform Module Software Stack 246 (TSS), which handles requests sent to a Trusted Platform Module (TPM) 220 coupled to the processor 240.

The TPM 220 is configured to provide cryptographic functions such as an RSA asymmetric algorithm for digital signature and for encryption, SHA-1 hashing, a Hash-based Message Authentication Code (HMAC) function, secure storage, random number generation, or other functions. The TPM 220 is implemented using software, firmware and/or hardware. The TPM components shown in FIG. 2 have been generalized and are not all-inclusive. Also, TPM architectures and functions may possibly change over time as authorized by the Trusted Computing Group (TCG).

As shown in FIG. 2, the TPM 220 comprises an input/output (I/O) interface 222 in communication with the processor 240. The I/O interface 222 couples to other TPM components such as cryptographic services 224, a random number source 226, asymmetric algorithms 228, storage 230 and Platform Configuration Registers (PCRs) 232. The cryptographic services 224 support functions such as hashing, digital signing, encryption and decryption. The random number source 226 generates random numbers for the cryptographic services 224. For example, in some embodiments, the cryptographic services 224 use random numbers to generate encryption keys. The asymmetric algorithms 228 enable the TPM 220 to perform asymmetric key operations. The storage 230 securely stores secrets (for example, encryption keys or other data) protected by the TPM 220. The PCRs 232 store information about the current state of the computer 202. For example, in some embodiments, the PCRs 232 store individual integrity measurements related to the computer 202 as well as sequences of integrity measurements.

The BIOS 210 comprises a TPM interface 214 as well as a local entity interface 216 and a remote entity interface 218. The BIOS 210 also comprises a volatile private storage 212, which can be used to store secrets such as One-Time Pad (OTP) data and/or a secret shared with the TPM 220 while the computer is active but not after power is removed. The TPM interface 214 enables secure communications between the BIOS 210 and the TPM 220, while the management application 219 enables non-secure communications between the BIOS 210 and the TPM 220.

Figure 3:
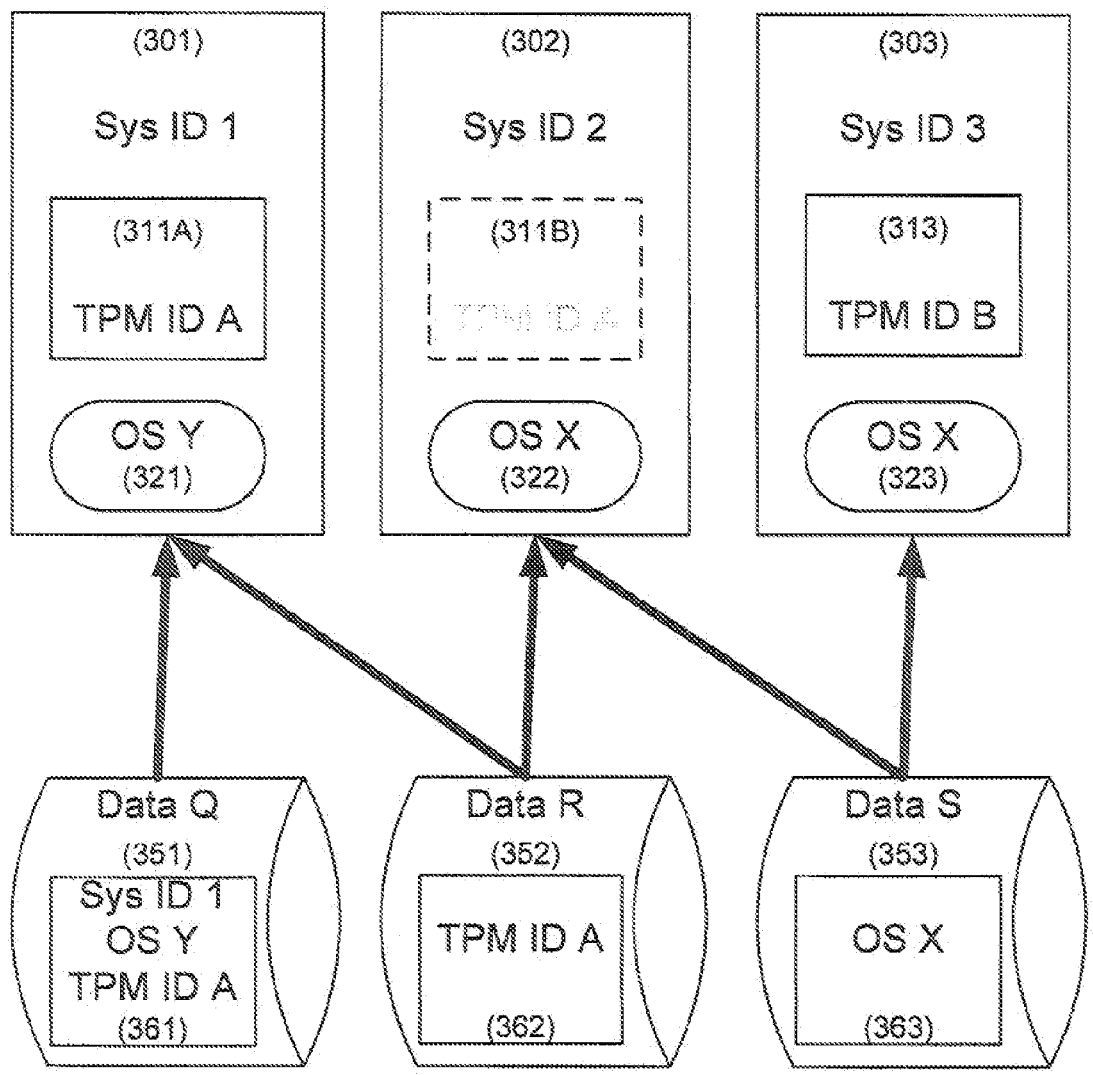
FIG. 3 illustrates multiple systems and multiple data in accordance with an exemplary embodiment of the invention.

FIG. 3 Shows three systems (301-303), which have Sys ID 1 through Sys ID 3 respectively. These systems include TPM's (311A, 311B, 313). TPM may be fixed to a system and thus unremovable (313), or may be a movable, such as TPM IDA (311) which can be installed in Sys ID 1 (311A in 301) or moved to Sys ID 2 (311B in 302). Systems may have different operating systems (OSs) installed (321-323).

Data (351-353), which may comprise user information, programs, or operating system components, may be digitally encoded with keys (361-363). This is the binding operations described above. Depending on the keys (361-363) used to bind the data (351-353), a system (301-303) may or may not be able to access the data (351-353). For example, if data Q (351) was bound using keys (361) comprising the "Sys ID 1", which identifies the first system (301), "OS Y", which identifies the OS installed on the system (321), and "TPM ID A", which identifies the TPM (311). Given this scenario, the data would be retrievable on system 1 (301), but would not be retrievable on other systems (302, 303). In an example where the data (352) is bounded using key(s) (362), comprising "TPM ID A", which identifies the TPM (311), but does not include a Sys ID or OS component as illustrated by Data R (352), any system (301, 302) which contains the appropriate TPM (311) would be able to access the data. Other examples are illustrated in FIG. 3, where the arrows show which system would be able to access the different data. Note that this assumes TPM ID A (311) is freely movable between the two systems (311A, 311B) and access would only be attempted when the TPM was in the system. If the TPM was not in the system, the data as illustrated would not be accessible in the system.

In the discussion of this application, a machine is generally to be construed as a specific physical hardware machine as a unique entity. A platform is generally to be construed as a specific type of hardware machine such as a specific model or a specific configuration. An environment is generally to be construed as a basic platform configured with a specific software such as an OS. These constructions are to be generally applied unless the specific context in which the term is used implies a different construction.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A first computing machine that is a first instance of a first computing platform, the first computing platform having a second computing machine as a second instance, the first computing machine comprising:
    a processor;
    a cryptographic co-processor coupled to the processor; and
    a Basic Input/Output System (BIOS) coupled to the processor to initialize the cryptographic co-processor with,
    at least one machine-specific key having a value specific to the first computing machine such that data encrypted using said machine-specific key can only be decrypted on said first computing machine, and
    at least one platform-specific key having a value specific to the first computing platform such that data encrypted using said platform-specific key can be decrypted on said first computing machine and on said second computing machine but not on any computing machine that is not an instance of said first computing platform.

2. The first computing machine of claim 1 wherein the platform-specific key has a configuration-specific value specific to a configuration of the first computing machine.

3. The first computing machine of claim 1 wherein the cryptographic co-processor:
    prevents decoding of data encoded with a machine-specific key specific to the second computing machine using the cryptographic co-processor while it was previously installed in the second computing machine; and
    allows decoding of data encoded with a non-machine-specific platform-specific key using the cryptographic co-processor while it was installed in the second computing machine that is an instance of the computing platform of which the first computing machine is an instance.

4. A method comprising:
    initializing a cryptographic co-processor with
    a machine-specific key having a value specific to a first computing machine such that data encrypted using the machine-specific key can be decrypted only on the first computing machine, and
    a platform-specific key having a value specific to a first computing platform such that data encrypted using said platform-specific key can be decrypted on the first computing machine and on a second computing machine that is also an instance of the first computing platform, but cannot be decrypted on a computing machine that is not an instance of said first computing platform;
    identifying unencrypted data to be encrypted;
    processing the unencrypted data using one of said machine-specific key and said platform-specific key so as to yield encrypted data; and
    storing the encrypted data on a non-transitory tangible readable medium.

5. A method as recited in claim 4 wherein the method further includes:
    after the storing, transferring the cryptographic co-processor to said second computing machine; and
    after the transferring, decrypting the encrypted data only if the unencrypted data was not encrypted using the machine-specific key.

6. A method as recited in claim 5 wherein the platform-specific key is based on preconfigured settings of the first computing machine's BIOS.

7. A method as recited in claim 5 wherein the platform-specific key is based on preconfigured settings of the first computing machine's operating system.

8. A method as recited in claim 5 further comprising, after the cryptographic co-processor has been transferred from the first computing machine to a second computing machine:
    in the event the data was encoded using the non-machine-specific platform-specific key to encode the data on the first computing machine, allowing the data to be decoded on the second computing machine; and
    in the event the data was encoded using the machine-specific key to encode the data on the first computing machine, preventing the data from being decoded on the second computing machine.

9. A non-transitory tangible computer-readable medium having instructions for causing a first computing machine that is an instance of a first computing platform to execute a method, the method including:
    initializing a cryptographic co-processor with,
    a machine-specific key having a value specific to the first computing machine such that data encrypted using said machine-specific key can only be decrypted on said first computing machine, and
    a platform-specific key having a value specific to a first computing platform of which the first computing machine is an instance such that data encrypted using said platform-specific key can be decrypted on said first computing machine and on a second computing machine that is an instance of said first computing platform but not on a computing machine that is not an instance of said first computing platform, the platform-specific key being determined during initialization;
    identifying, from storage, unencrypted data to be encrypted using one of said machine-specific key and said platform-specific key; and
    processing the unencrypted data so as to yield encrypted data.

10. A non-transitory tangible computer-readable medium as recited in claim 9 wherein the method further includes:
    prior to processing the data, identifying the machine-specific key and the platform-specific key; and
    altering processing of the data based on the machine-specific key and the platform-specific key.

11. A non-transitory tangible computer-readable medium as recited in claim 10 identifying the determined keys includes:
    presenting the machine-specific key and the platform-specific key to user; and
    retrieving user preferences of values on which to base altered processing.

* * * * *